(12) United States Patent
Hao et al.

(10) Patent No.: US 9,910,541 B2
(45) Date of Patent: Mar. 6, 2018

(54) MIS-TOUCH RECOGNITION METHOD AND DEVICE

(71) Applicant: ZTE Corporation, Shenzhen (CN)

(72) Inventors: Zhijian Hao, Shenzhen (CN); Chao Wan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/890,195

(22) PCT Filed: Sep. 18, 2013

(86) PCT No.: PCT/CN2013/083806
§ 371 (c)(1),
(2) Date: Nov. 10, 2015

(87) PCT Pub. No.: WO2014/169567
PCT Pub. Date: Oct. 23, 2014

(65) Prior Publication Data
US 2016/0154526 A1 Jun. 2, 2016

(30) Foreign Application Priority Data
Aug. 20, 2013 (CN) .......................... 2013 1 0364304

(51) Int. Cl.
*G06F 3/041* (2006.01)
*G06F 3/0488* (2013.01)
*G06F 3/044* (2006.01)

(52) U.S. Cl.
CPC ............ *G06F 3/0418* (2013.01); *G06F 3/044* (2013.01); *G06F 3/0488* (2013.01); *G06F 2203/04104* (2013.01)

(58) Field of Classification Search
None
See application file for complete search history.

(56) References Cited

U.S. PATENT DOCUMENTS

2009/0174679 A1\* 7/2009 Westerman ......... G06F 3/03547
345/173
2010/0139990 A1 6/2010 Westerman et al.
(Continued)

FOREIGN PATENT DOCUMENTS

CN 1912819 A 2/2007
CN 101794197 A 8/2010
(Continued)

OTHER PUBLICATIONS

International Search Report for corresponding application PCT/CN2013/083806 filed Sep. 18, 2013; dated May 21, 2014.
(Continued)

*Primary Examiner* — Nicholas Lee
(74) *Attorney, Agent, or Firm* — Cantor Colburn LLP (57) ABSTRACT

Provided are a mis-operation recognition method and device. In the method, a profile of a touch is determined according to the touch on a touch screen; whether a horizontal coordinate corresponding to a maximum vertical length of the profile is located within a predetermined location range on the touch screen or not is judged; and in a case that it is judged that the horizontal coordinate is located within the predetermined location range, the touch corresponding to the profile is recognized as a mis-touch. By means of the technical solution, a problem caused by a mis-touch generated when a touch screen device is held by a hand is solved, and a mis-operation is prevented, thereby improving user experience.

20 Claims, 7 Drawing Sheets

(56) References Cited

U.S. PATENT DOCUMENTS

2014/0049494 A1\* 2/2014 Niu .................. G06F 3/0488
 345/173
2014/0125612 A1\* 5/2014 Park .................. G06F 3/0416
 345/173

FOREIGN PATENT DOCUMENTS

| CN | 102289321 A | 12/2011 |
|---|---|---|
| EP | 2077490 A2 | 7/2009 |
| EP | 2626778 A2 | 8/2013 |
| WO | 2012173106 A1 | 12/2012 |

OTHER PUBLICATIONS

Exteded European Search Report dated Jun. 10, 2016 re: Application No. PCT/CN2013/083806; pp. 1-6; citing: EP 2 077 490 A2, US 2010/139990 A1, EP 2 626 778 A2 and WO 2012/173106 A1.

\* cited by examiner

MIS-TOUCH RECOGNITION METHOD AND DEVICE

TECHNICAL FIELD

The present disclosure relates to the field of communications, and particularly to a mis-touch recognition method and device.

BACKGROUND

At present, there are several major types of touch screens as follows: resistive touch screens, surface-capacitive touch screens and induction capacitive touch screens, surface acoustic wave touch screens, infrared touch screens and so on. The capacitive touch screens are more widely applied, mainly in communications and consumer electronics, such as smart phones, mobile phones, multimedia players, PADs and so on.

A capacitive touch screen, which determines a touch point by sensing a change in a capacitance caused by a touch, is provided with two groups of signal lines: a driving line that emits a signal and an induction line that senses a change in a capacitance value. When a finger touches a metal layer, the finger and the surface of the touch screen form a coupling capacitor because of the existence of an electric field of the human body. The capacitor is a direct conductor for a high frequency current, whereupon the finger absorbs an extremely small current from the touch point, thereby affecting coupling of two electrodes around the touch point to change a capacitance between these two electrodes. When a mutual capacitance is detected, electrodes in the direction of the driving line emit an excitation signal in turn while all electrodes in the direction of the induction line receive the signal simultaneously, so as to acquire changes in capacitance values of intersections of all row electrodes and column electrodes, that is the capacitances of a two-dimensional plane of the touch screen. The coordinates of each touch point can be calculated according to data of a change in capacitances of a two-dimensional plane of the touch screen, thus the true coordinates of each touch point can be calculated even if there is a plurality of touch points on the screen.

With the progress of the technology of handheld mobile communication terminals having a touch screen, more and more users are using a handheld mobile communication terminal having a touch screen. A touch screen, which responses more sensitively to a conductor (e.g., a finger), brings good experience for a user. However, a mis-touch is generated easily at edges of the touch screen, when a device having the touch screen is held by hand, thus affecting user application. Especially, when a user operates, with one hand, a device having a touch screen with a large size or designed with a narrow edge, or holds the device with one hand while operates the device with the other hand, a mis-touch is generated easily on the touch screen by the hand holding the device, thus an error point may be generated on the touch screen to affect an operation of the user and user experience.

At present, there is no effective solution yet for a problem caused by a mis-touch generated when a touch screen device is held by a hand.

SUMMARY

The embodiments of the present disclosure provide a mis-touch recognition method and device to at least solve a problem caused by a mis-touch generated when a touch screen device is held by a hand.

A mis-touch recognition method is provided according to an aspect of embodiments of the present disclosure, including that: a profile of a touch is determined according to the touch on a touch screen; whether a horizontal coordinate corresponding to a maximum vertical length of the profile is located within a predetermined location range on the touch screen or not is judged; and in a case that it is judged that the horizontal coordinate is located within the predetermined location range, the touch corresponding to the profile is recognized as a mis-touch.

In an example embodiment, the predetermined location range includes a horizontal coordinate of points a distance of which to a left edge or right edge of the touch screen is less than or equal to a predetermined value.

In an example embodiment, determining the profile of the touch includes that a plurality of coordinates on the profile of the touch are determined; and judging whether the horizontal coordinate corresponding to the maximum vertical length of the profile is located within the predetermined location range on the touch screen or not includes that whether a horizontal coordinate of two points having a largest vertical coordinate difference in the plurality of coordinates is located within the predetermined location range is judged.

In an example embodiment, the method further includes that, in a case that it is judged that the horizontal coordinate is not located within the predetermined location range, whether an area of a graph formed by the profile exceeds a predetermined threshold is further judged; in a case that it is judged that the area of the graph formed by the profile exceeds the predetermined threshold, the touch corresponding to the profile is recognized as a mis-touch.

In an example embodiment, the predetermined threshold is determined according to a location of an area on the touch screen.

In an example embodiment, in a case that there is a plurality of touches, one or more mis-touches in the plurality of touches are recognized separately.

In an example embodiment, the method further includes that the predetermined location range and/or a predetermined threshold are/is set according to an input of a user.

A mis-operation recognition device is further provided according to another aspect of the embodiments of the present disclosure, including: a determining component, configured to determine, according to a touch on a touch screen, a profile of the touch; a first judging component, configured to judge whether a horizontal coordinate corresponding to a maximum vertical length of the profile is located within a predetermined location range on the touch screen or not; and a first recognizing component configured to recognize, in a case that it is judged that the horizontal coordinate is located within the predetermined location range, the touch corresponding to the profile as a mis-touch.

In an example embodiment, the device further includes: a second judging component configured to further judge, in a case that a judging result of the first judging component is that the horizontal coordinate is not located within the predetermined location range, whether an area of a graph formed by the profile exceeds a predetermined threshold; a second recognizing component configured to recognize, in a case that it is judged that the area of the graph formed by the profile exceeds the predetermined threshold, the touch corresponding to the profile as a mis-touch.

In an example embodiment, the device further includes: a setting component, configured to set the predetermined location range and/or a predetermined threshold according to an input of a user.

By means of the embodiments of the present disclosure, a profile of a touch is determined according to the touch on a touch screen; whether a horizontal coordinate corresponding to a maximum vertical length of the profile is located within a predetermined location range on the touch screen or not is judged; and in a case that it is judged that the horizontal coordinate is located within the predetermined location range, the touch corresponding to the profile is recognized as a mis-touch, thereby solving a problem caused by a mis-touch generated when a touch screen device is held by a hand, preventing a mis-operation and improving user experience.

BRIEF DESCRIPTION OF THE DRAWINGS

The accompanying drawings, which constitute a part of the application, are used for providing further understanding to the present disclosure. The exemplary embodiments of the present disclosure and illustration thereof are used for explaining the present disclosure, instead of constituting improper limitation to the present disclosure. In the accompanying drawings.

DETAILED DESCRIPTION OF THE EMBODIMENTS

It needs to be noted that the embodiments in the application and the characteristics in the embodiments may be combined with each other if there is no conflict. The present disclosure will be expounded hereinafter with reference to the accompanying drawings and in combination with the embodiments.

In addition, the steps illustrated in the flowcharts of the accompanying drawings may be executed in a computer system, such as a group of computer-executable instructions. Although logical sequences are illustrated in the flowcharts, the steps as illustrated or described may be executed in sequences different from those described herein in some cases.

Figure 1:
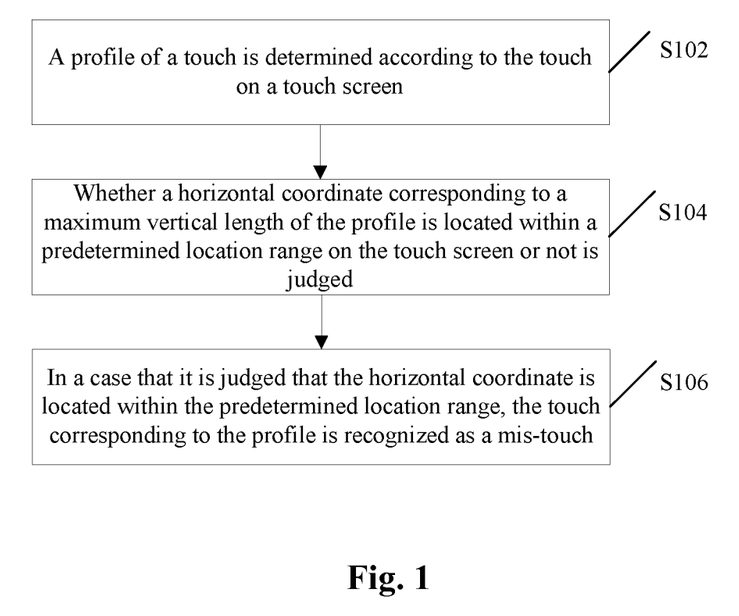
FIG. 1 is a flowchart of a mis-touch recognition method according to an embodiment of the application.

An embodiment of the present embodiment provides a mis-touch recognition method. FIG. 1 is a flowchart of a mis-touch recognition method according to an embodiment of the application. As shown in FIG. 1, the flow includes the following steps.

Step 102: A profile of a touch is determined according to the touch on a touch screen.

Step 104: Whether a horizontal coordinate corresponding to a maximum vertical length of the profile is located within a predetermined location range on the touch screen or not is judged.

Step 106: In a case that it is judged that the horizontal coordinate is located within the predetermined location range, the touch corresponding to the profile is recognized as a mis-touch.

By means of the foregoing steps, after the profile of the touch is determined, the touch corresponding to the profile is recognized as a mis-touch if it is judged that the horizontal coordinate corresponding to the maximum vertical length of the profile is located within the predetermined location range. For example, the predetermined location range is set as a certain range around edges of the touch screen in a case. In this way, those touch operations that are mis-touches can be recognized through properties of the touches, thereby solving a problem caused by a mis-touch generated when a touch screen device is held by a hand, preventing a mis-operation and improving user experience.

In an example embodiment, the predetermined location range may be a horizontal coordinate of points a distance of which to a left edge or right edge of the touch screen is less than or equal to a predetermined value. In a touch screen with two adjacent sides vertical to each other, the horizontal coordinate is related to the widths to the left edge and the right edge of the touch screen. That is, a range of a certain width to an edge of the touch screen may be used as the predetermined location range for the judgment, and this width may be adjusted according to a setting of a user.

In addition, it needs to be noted that the horizontal and vertical are described from the perspective that the user holds a device having the touch screen. That is, either of two adjacent sides of a touch screen, in which adjacent sides are vertical to each other, may be considered horizontal or vertical. The left edge and right edge as described above may be considered as vertical edges (vertical to the horizontal direction).

It can be learned from the foregoing description that the embodiment may be not only applied to recognition of mis-touches of the left and right edges of the touch screen, but also applied to recognition of mis-touches of upper and lower edges of the touch screen.

In some example embodiments, a mis-touch is recognized according to the coordinates corresponding to the touch. A coordinate system of a certain reference system needs to be created first during application. For example, the coordinate system is created by using the horizontal direction and the vertical direction and using the center of the touch screen as an origin. The location of any point on the touch screen can be described uniquely by the created coordinate system. In this case, a plurality of coordinates on the profile of the touch may be determined first, and whether a horizontal coordinate of two points having a largest vertical coordinate difference in the plurality of coordinates is located within the predetermined location range is judged subsequently. The largest vertical coordinate difference may be used for representing the maximum vertical length.

In an example embodiment, in a case that it is judged that the horizontal coordinate is not located within the predetermined location range, whether an area of a graph formed by the profile exceeds a predetermined threshold may be further judged, and in a case that it is judged that the area of the graph formed by the profile exceeds the predetermined threshold, the touch corresponding to the profile is recognized as a mis-touch. Since a common touch is a point touch or a multi-point touch, touches of a relatively large area are usually mis-touches and these large area mis-touches may be further recognized by means of the foregoing method.

In an example embodiment, the predetermined threshold may be determined according to a location of an area on the touch screen. For example, a predetermined threshold of an area close to one or more edges on the touch screen is set as a first predetermined threshold, and a predetermined threshold of other areas on the touch screen is set as a second predetermined threshold. In an example embodiment, the first predetermined threshold may be included in a range represented by the second predetermined threshold, and of course, the first predetermined threshold may also be equal to the range represented by the second predetermined threshold. In this way, the predetermined thresholds may be set flexibly so that the method of judging the mis-touch by judging the area of the profile is more flexible and practical.

In an example embodiment, in a case that there is a plurality of touches, one or more mis-touches in the plurality of touches may be recognized separately by the method described above. In an example embodiment, the plurality of touches refers to a plurality of simultaneous touches on the touch screen. In this way, the plurality of touches may be processed simultaneously so that one or more mis-touches among the plurality of touches can be recognized.

In an example embodiment, a method for setting the predetermined location range and the predetermined threshold is further provided. For example, the predetermined location range and/or the predetermined threshold may be set according to an input of a user.

In an example embodiment, before judging whether the horizontal coordinate corresponding to the maximum vertical length of the profile is located within the predetermined location range, whether there are horizontal coordinates on the profile overlapped with the predetermined location range may be judged first. A touch corresponding to a profile not overlapped with the predetermined location range may be recognized as a mis-touch by other methods, thus further optimizing the flow of the present embodiment.

An embodiment further provides a mis-touch recognition device to implement the mis-touch recognition method. Functions of components and units involved in the device may be described and illustrated with reference to implementation of functions corresponding to the mis-touch recognition method, and will not be repeated in the present embodiment.

Figure 2:
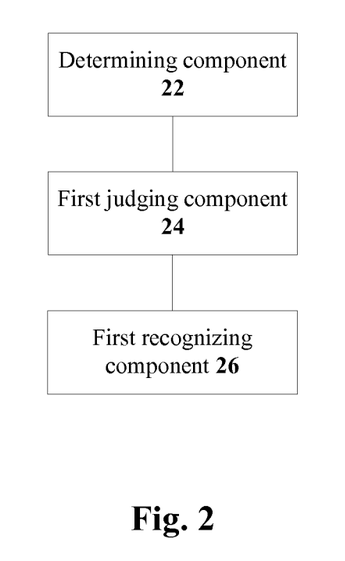
FIG. 2 is a structural block diagram of a mis-touch recognition device according to an embodiment of the application.

FIG. 2 is a structural block diagram of a mis-touch recognition device according to an embodiment of the application. As shown in FIG. 2, the device may include: a determining component 22, a first judging component 24 and a first recognizing component 26, wherein the determining component 22 is configured to determine, according to a touch on a touch screen, a profile of the touch; the first judging component 24 is coupled to the determining component 22 and configured to judge whether a horizontal coordinate corresponding to a maximum vertical length of the profile is located within a predetermined location range on the touch screen or not; and the first recognizing component 26 is coupled to the first judging component 24 and configured to recognize, in a case that the first judging component 24 judges that the horizontal coordinate is located within the predetermined location range, the touch corresponding to the profile as a mis-touch.

The components and units involved in the present embodiment may be implemented by means of software, and may be also implemented by means of hardware. The components and units described in the present embodiment may be also arranged in a processor which may be described as follows, for example: a processor, including the determining component 22, the first judging component 24 and the first recognizing component 26, wherein the names of these components does not constitute limitation to the components in some cases. For example, the determining component may be also described as "a component configured to determine, according to a touch on a touch screen, a profile of the touch".

In an example embodiment, the predetermined location range includes a horizontal coordinate of points a distance of which to a left edge or right edge of the touch screen is less than or equal to a predetermined value.

In an example embodiment, the determining component 22 is configured to determine a plurality of coordinates on the profile of the touch, and the first judging component 24 is configured to judge whether a horizontal coordinate of two points having a largest vertical coordinate difference in the plurality of coordinates is located within the predetermined location range.

Figure 3:
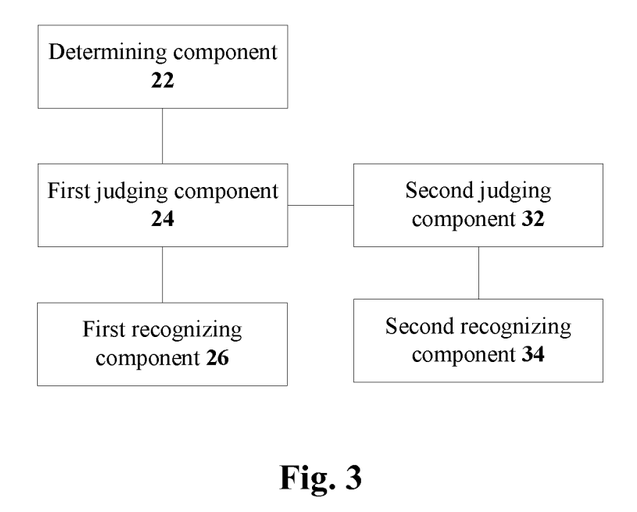
FIG. 3 is a structural block diagram of a mis-touch recognition device according to an example embodiment of the application.

FIG. 3 is a structural block diagram of a mis-touch recognition device according to an example embodiment of the application. As shown in FIG. 3, the device may further include: a second judging component 32 coupled to the first judging component 24 and configured to further judge, in a case that it is judged that the horizontal coordinate is not located in the predetermined location range, whether an area of a graph formed by the profile exceeds a predetermined threshold; a second recognizing component 34 coupled to the second judging component 32 and configured to recognize, in a case that the second judging component 32 judges that the area of the graph formed by the profile exceeds the predetermined threshold, the touch corresponding to the profile as a mis-touch.

In an example embodiment, the predetermined threshold is determined according to a location of an area on the touch screen.

In an example embodiment, in a case that there is a plurality of touches, one or more mis-touches in the plurality of touches are recognized separately by the device or an example device.

In an example embodiment, the device further includes: a setting component, configured to set the predetermined location range and/or a predetermined threshold according to an input of a user.

The present embodiment further provides a terminal The terminal includes a touch screen and the mis-touch recognition device.

It needs to be noted that: the mis-touch recognition method and device may have various forms of variations, such as the following two forms.

Method 1

A mis-touch recognition method, including that a profile of a touch is determined according to the touch on a touch screen; whether a distance from the longest line, parallel to an edge of the touch screen, on the profile is in a predetermined location range is judged, and in a case that the distance is located in the predetermined location range, the touch corresponding to the profile is recognized as a mis-touch.

The method may be applied in a touch screen device with a touch screen having a non-straight edge.

Method 2

A mis-touch recognition method, including that a profile of a touch is determined according to the touch on a touch screen; whether the location of a point corresponding to the largest width and the largest length of the profile on the touch screen is in a predetermined location range; and in a case that the judging result is the location of the point is in the predetermined location range, the touch corresponding to the profile is recognized as a mis-touch.

The point corresponding to the largest width and the largest length refers to an intersection of the longest segment of the profile in a first direction and the longest segment of the profile in a second direction. The first direction and the second direction may be two directions vertical to each other. In an example embodiment, the first direction and the second direction are parallel to two intersecting and vertical edges of the touch screen respectively.

Description and illustration will be provided below in combination with example embodiments.

The present example embodiment provides a solution for preventing a mis-touch from being generated easily at an edge when a device having a touch screen is held by a hand.

Figure 4:
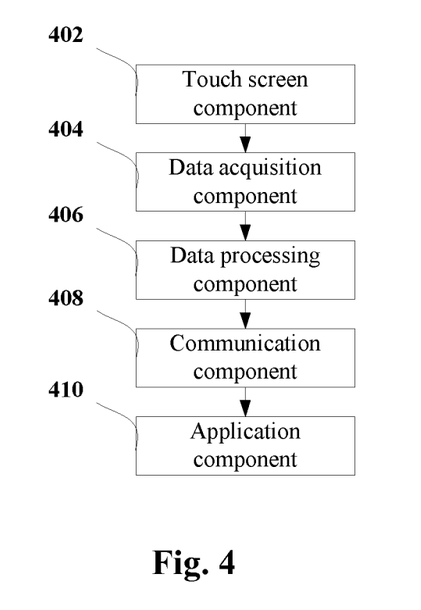
FIG. 4 is a structural block diagram of a mis-touch recognition device according to another example embodiment of the application.

A mis-touch recognition device is provided according to an aspect of the present example embodiment. FIG. 4 is a structural block diagram of a mis-touch recognition device according to another example embodiment of the application. As shown in FIG. 4, the device includes the following components:

a touch screen component 402, which is a touch screen entity equipped on a communication terminal device;

a data acquisition component 404, coupled to the touch screen component 402 and configured to acquire data of a change in a capacitance of each channel of each touch area;

a data processing component 406, coupled to the data acquisition component 404 and configured to calculate, according to the data acquired by the data acquisition component, coordinates and touch areas of a plurality of sampling points corresponding to each touch, calculate the largest ordinate difference under the same abscissa and judge whether a touch is a mis-touch;

a communication component 408, coupled to the data processing component 406 and configured to carry out the communication between the touch screen component and a host, for example, the communication component may be embodied as i2c;

an application component 410, coupled to the communication component 408 and configured to distribute touch point information acquired by the host to a corresponding application component so that the application can use the touch point information.

Figure 5:
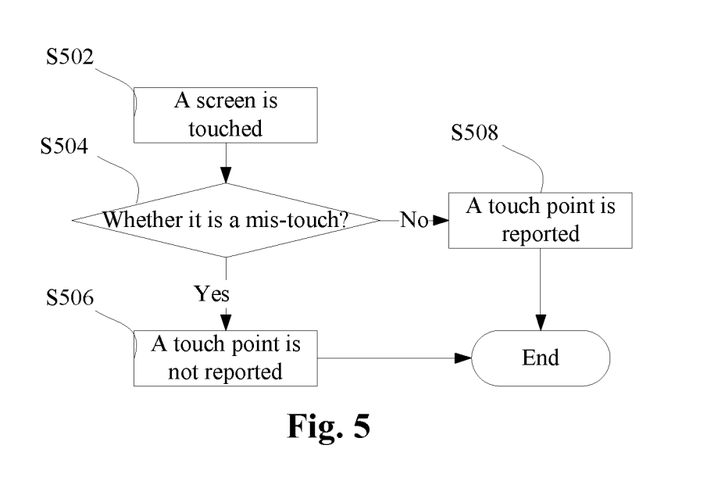
FIG. 5 is a flowchart of a mis-touch recognition method according to another example embodiment of the application.

FIG. 5 is a flowchart of a mis-touch recognition method according to another example embodiment of the application. As shown in FIG. 5, the method further includes processing to a recognized mis-touch. The method includes the following steps.

Step 502: A device having a touch screen is turned on and the touch screen is awakened and touched.

Step 504: Whether the touch is a mis-touch is judged.

Step 506: If the touch on the touch screen is a mis-touch, the touch is ineffective and the touch point is not reported.

Step 508: If the touch on the touch screen is a normal touch, the touch is effective and the touch point is reported.

By means of the foregoing solution, a touch at an edge location may be effectively identified as a normal touch or a mis-touch by judging whether the largest ordinate difference of each sampling point of each touch at the edge location is in a mis-operation area and whether the largest area of the sampling points of each touch at the edge location exceeds a threshold, thus effectively solving the problem of a mis-touch generated easily by a finger or a palm at an edge of the screen when a user holds the device having the touch screen and improving use experience of the user.

Elaboration and illustration will be further provided below by taking mis-touch areas at a left edge and a right edge of a touch screen as an example. It needs to be noted that locations corresponding to an upper edge and a lower edge are also applicable to the embodiments of the present disclosure.

Figure 6:
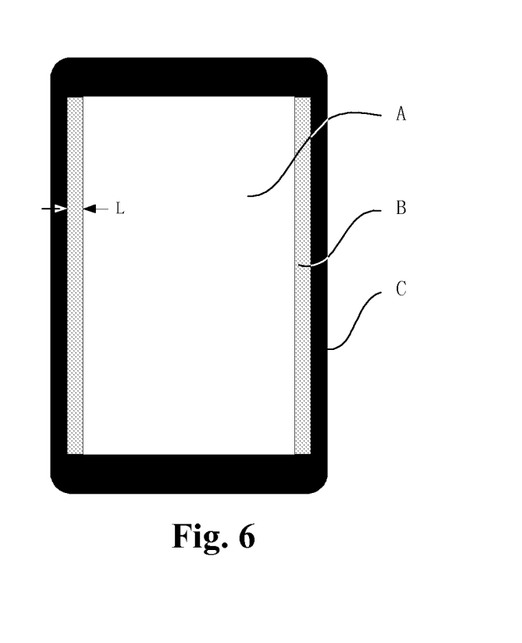
FIG. 6 is a schematic diagram of a handheld touch screen device according to an example embodiment of the application.

FIG. 6 is a schematic diagram of a handheld touch screen device according to an example embodiment of the application. Area A (the white part) as illustrated in the figure is a normal response area of the touch screen, area B (the shaded part) is a mis-touch area at edges at two sides of the touch screen, area C (the black part) is a non-response area of the touch screen, and L is the set width of a mis-operation area, and this value is adjustable. Area A and area B are visible areas. Area C is an invisible area and the width thereof varies per the specific terminal. The width of area C is narrow, or may even be zero on a terminal designed with a narrow edge.

FIG. 7a to FIG. 7f are schematic diagrams of a touch screen device held by a hand according to an example embodiment of the application, and illustration will be provided below with reference to these figures.

Figure 7A:
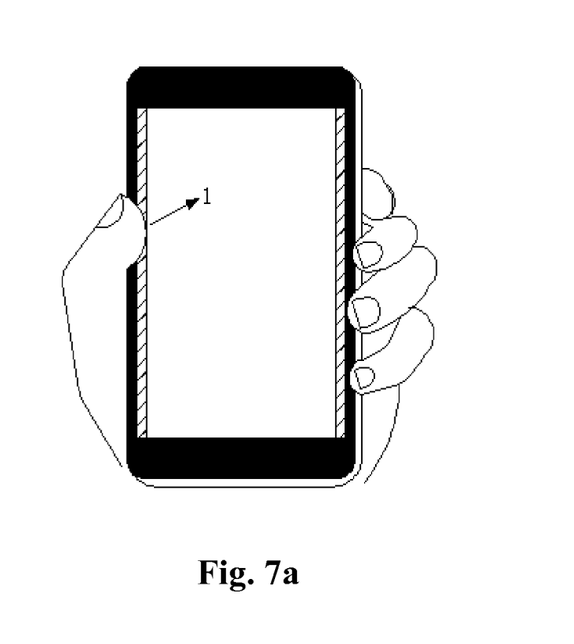
FIG. 7a to FIG. 7f are schematic diagrams of a touch screen device held by a hand according to an example embodiment of the application.

As shown in FIG. 7a, when the touch screen terminal is held by a hand, finger 1 gently touches an edge of the screen, that is, a single finger only touches area B, and the judgment proposed by the present example embodiment that the abscissa corresponding to the largest ordinate difference of the touch area is in the mis-touch area is satisfied, therefore, the touch is a mis-touch.

Figure 7B:
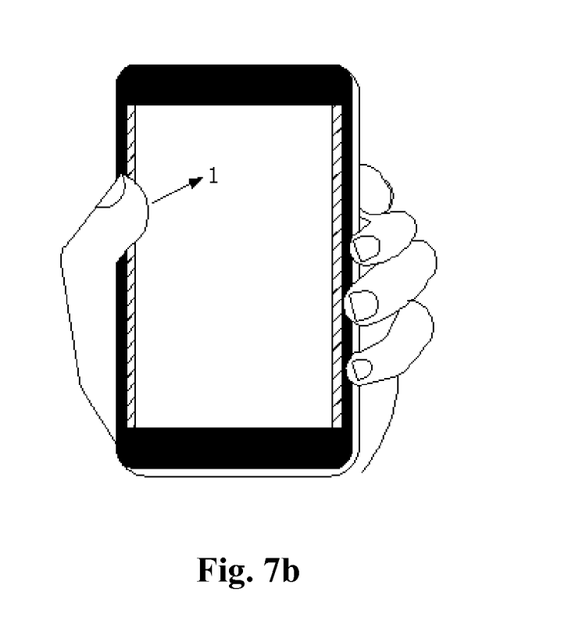

As shown in FIG. 7b, when the touch screen terminal is held by a hand, finger 1 gently touches an edge of the screen, that is, a single finger touches area B and area C at the same time, and the judgment proposed by the present example embodiment that there is a sampling point in the mis-touch area and the abscissa corresponding to the largest ordinate difference of the touch area is in the mis-touch area is satisfied, therefore, the touch is a mis-touch.

Figure 7C:
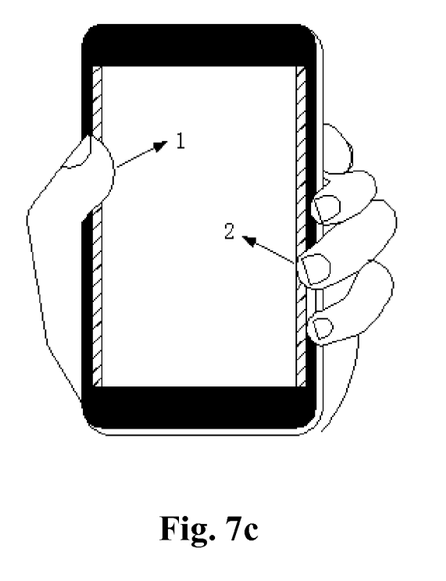

As shown in FIG. 7c, when the touch screen terminal is held by a hand, finger 1 and finger 2 touch an edge of the screen respectively, that is area B and area C are touched by a plurality of fingers simultaneously, and the judgment proposed by the present example embodiment that sampling points of each touch are acquired, there is a sampling point in the mis-touch area and the abscissa corresponding to the largest ordinate difference of the touch area is in the mis-touch area is satisfied, therefore, the touches of finger 1 and finger 2 are mis-touches.

Figure 7D:
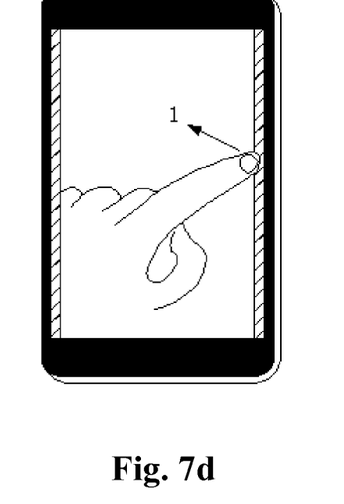

As shown in FIG. 7d, when the touch screen terminal is held by a hand, almost the whole finger 1 touches the screen, that is a large area touch by a single finger, and the judgment proposed by the present example embodiment that a contact area exceeds a certain area threshold is satisfied, therefore, the touch is a mis-touch.

Figure 7E:
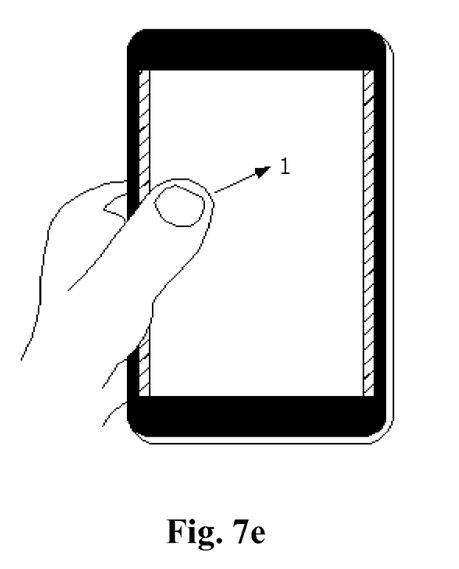

As shown in FIG. 7e, finger 1 clicks on the touch screen and mainly acts on area A, while there is also a sampling point in the mis-operation area B, but the judgment proposed by the present example embodiment that the abscissa corresponding to the largest ordinate difference of the touch area is in the mis-touch area is not satisfied, therefore, the touch is a normal touch.

Figure 7F:
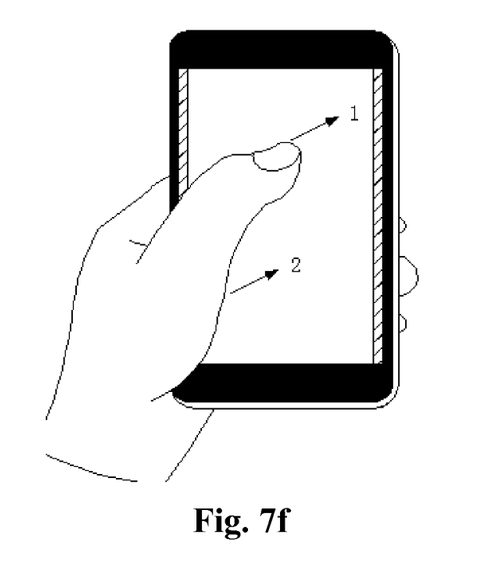

As shown in FIG. 7f, a hand holds the touch screen device while operating the screen. In the solution proposed by the present example embodiment, a touch of palm 2 on an edge of the touch screen is a mis-touch while a touch of finger 1 on area A of the touch screen is a normal touch.

In the solution of the present example embodiment, the mis-touch of the palm will not be reported as a touch point, thereby avoiding influence of the mis-touch to a normal response of a touch of finger 1 and improving client experience.

Figure 8:
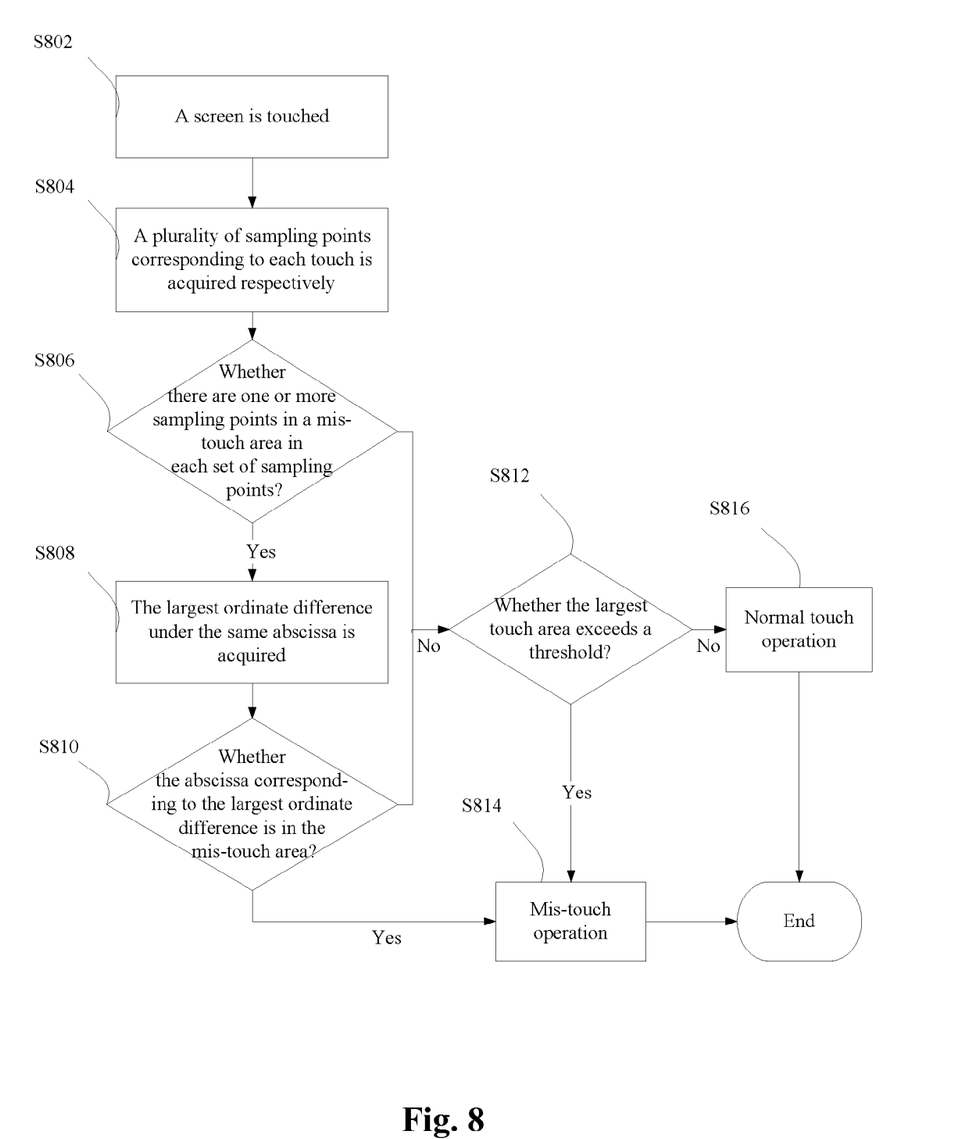
FIG. 8 is a flowchart of judging whether a touch is a normal touch or a mis-touch according to an example embodiment of the application.

FIG. 8 is a flowchart of judging whether a touch is a normal touch or a mis-touch according to an example embodiment of the application. As shown in FIG. 8, the flow includes the following steps:

Step 802: A touch screen is awakened and touched, the touch may be a single-finger touch and may be also a multi-finger touch, and a location touched on the screen is not limited.

Step 804: Data of each touch is acquired respectively, and the coordinates of a plurality of sampling points corresponding to each touch are calculated.

Step 806: Whether each set of sampling points includes one or more sampling points in a mis-touch area is judged.

Step 808: If the set of sampling points includes one or more sampling points in the mis-touch area, the largest ordinate difference under the same abscissa in the plurality of sampling points is calculated.

Step 810: Whether the abscissa corresponding to the largest ordinate difference is located in the mis-touch area is judged.

Step 812: If the set of sampling points does not include any sampling point in the mis-touch area, or the abscissa corresponding to the largest ordinate difference is not located in the mis-touch area, the largest touch area of the touch is calculated, and whether the area exceeds a threshold is judged, wherein an edge area and a central area may correspond to different area thresholds.

Step 814: If the abscissa corresponding to the largest ordinate difference is located in the mis-touch area, it is judged that the touch is a mis-touch.

Step 816: If the largest touch area of the touch is in the predetermined threshold, it is judged that the touch is a normal touch; otherwise, it is judged that the touch is a mis-touch.

To sum up, by means of the embodiments, example embodiments and example modes of execution of the application, a problem caused by a mis-touch generated when a touch screen device is held by a hand is solved, and a mis-operation is prevented, thereby improving user experience.

INDUSTRIAL APPLICABILITY

The present disclosure may be applied on any handheld devices having a touch screen by means of the foregoing embodiments, a problem caused by a mis-touch generated when a touch screen device is held by a hand is solved, and a mis-operation is prevented, thereby improving user experience. The present disclosure has good compatibility, and thus has excellent industrial applicability.

Obviously, those skilled in the art should understand that the components or steps of the present disclosure may be implemented by general computing devices and centralized on a single computing device or distributed on a network consisting of multiple computing devices. Optionally, the components or steps may be implemented by program codes executable by a computing device, so that they may be stored in a storage device and executed by the computing device, or they may be implemented by respectively fabricating them into integrated circuit components or by fabricating multiple components or steps in the components or steps into a single integrated circuit component. By doing so, the embodiments of the present disclosure are not limited to any specific combination of hardware and software.

The above are only example embodiments of the present disclosure, but are used for limiting the present disclosure. For those skilled in the art, the present disclosure may have various modifications and changes. Any modifications, equivalent replacements, improvements and the like made within the principles of the present disclosure shall be included in the scope of protection defined by the claims of the present disclosure.

What is claimed is:

1. A mis-operation recognition method, comprising:
    determining, according to a touch on a touch screen, a profile of the touch;
    judging whether a horizontal coordinate corresponding to a maximum vertical length of the profile is located within a predetermined location range on the touch screen or not;
    in a case that it is judged that the horizontal coordinate is located within the predetermined location range, recognizing the touch corresponding to the profile as a mis-touch; and
    in a case that is judged that the horizontal coordinate is not located within the predetermined location range, further judging whether an area of a graph formed by the profile exceeds a predetermined threshold; in a case that it is judged that the area of the graph formed by the profile exceeds the predetermined threshold, recognizing the touch corresponding to the profile as a mis-touch.

2. The method as claimed in claim 1, wherein the predetermined location range comprises a horizontal coordinate of points a distance of which to a left edge or right edge of the touch screen is less than or equal to a predetermined value.

3. The method as claimed in claim 2, wherein
    determining the profile of the touch comprises: determining a plurality of coordinates on the profile of the touch;
    judging whether the horizontal coordinate corresponding to the maximum vertical length of the profile is located within the predetermined location range on the touch screen or not comprises: judging whether a horizontal coordinate of two points having a largest vertical coordinate difference in the plurality of coordinates is located within the predetermined location range.

4. The method as claimed in claim 1, wherein the predetermined threshold is determined according to a location of an area on the touch screen.

5. The method as claimed in claim 1, wherein in a case that there is a plurality of touches, one or more mis-touches in the plurality of touches are recognized separately.

6. The method as claimed in claim 1, further comprising:
    setting the predetermined location range and/or a predetermined threshold according to an input of a user.

7. A mis-operation recognition device, comprising:
    a determining component, configured to determine, according to a touch on a touch screen, a profile of the touch;
    a first judging component, configured to judge whether a horizontal coordinate corresponding to a maximum vertical length of the profile is located within a predetermined location range on the touch screen or not;

a first recognizing component configured to recognize, in a case that it is judged that the horizontal coordinate is located within the predetermined location range, the touch corresponding to the profile as a mis-touch;

a second judging component configured to further judge, in a case that a judging result of the first judging component is that the horizontal coordinate is not located within the predetermined location range, whether an area of a graph formed by the profile exceeds a predetermined threshold; and a second recognizing component configured to recognize, in a case that it is judged that the area of the graph formed by the profile exceeds the predetermined threshold, the touch corresponding to the profile as a mis-touch.

8. The device as claimed in claim 7, further comprising:
a setting component, configured to set the predetermined location range and/or a predetermined threshold according to an input of a user.

9. The method as claimed in claim 2, wherein in a case that there is a plurality of touches, one or more mis-touches in the plurality of touches are recognized separately.

10. The method as claimed in claim 3, wherein in a case that there is a plurality of touches, one or more mis-touches in the plurality of touches are recognized separately.

11. The method as claimed in claim 4, wherein in a case that there is a plurality of touches, one or more mis-touches in the plurality of touches are recognized separately.

12. The method as claimed in claim 2, further comprising:
setting the predetermined location range and/or a predetermined threshold according to an input of a user.

13. The method as claimed in claim 3, further comprising:
setting the predetermined location range and/or a predetermined threshold according to an input of a user.

14. The method as claimed in claim 4, further comprising:
setting the predetermined location range and/or a predetermined threshold according to an input of a user.

15. The device as claimed in claim 7, further comprising:
a setting component, configured to set the predetermined location range and/or a predetermined threshold according to an input of a user.

16. A mis-operation recognition method, comprising:
determining, according to a touch on a touch screen, a profile of the touch;

judging whether a horizontal coordinate corresponding to a maximum vertical length of the profile is located within a predetermined location range on the touch screen or not, wherein the predetermined location range comprises a horizontal coordinate of points a distance of which to a left edge or a right edge of the touch screen is less than or equal to a predetermined valued; and in a case that it is judged that the horizontal coordinate is located within the predetermined location range, recognizing the touch corresponding to the profile as a mis-touch;

wherein determining the profile of the touch comprises: determining a plurality of coordinates on the profile of the touch; and judging whether the horizontal coordinate corresponding to the maximum vertical length of the profile is located within the predetermined location range on the touch screen or not comprises: judging whether a horizontal coordinate of two points having a largest vertical coordinate difference in the plurality of coordinates is located within the predetermined location range.

17. The method as claimed in claim 16, further comprising: in a case that it is judged that the horizontal coordinate is not located within the predetermined location range,
further judging whether an area of a graph formed by the profile exceeds a predetermined threshold;
in a case that is judged that the area of a graph formed by the profile exceeds the predetermined threshold, recognizing the touch corresponding to the profile as a mis-touch.

18. The method as claimed in claim 17, wherein the predetermined threshold is determined according to a location of an area on the touch screen.

19. The method as claimed in claim 16, wherein in a case that there is a plurality of touches, one or more mis-touches in the plurality of touches are recognized separately.

20. The method as claimed in claim 16, further comprising:
setting the predetermined location range and/or a predetermined threshold according to an input of a user.

* * * * *